United States Patent [19]

Utsui

[11] Patent Number: 4,761,874
[45] Date of Patent: Aug. 9, 1988

[54] METHOD OF MAKING MAGNETIC RECORDING MEDIUM

[75] Inventor: Masaaki Utsui, Kanagawa, Japan

[73] Assignee: Fuji Photo Film Co., Ltd., Kanagawa, Japan

[21] Appl. No.: 32,695

[22] Filed: Apr. 1, 1987

[30] Foreign Application Priority Data

Apr. 1, 1986 [JP] Japan .................................. 61-75076

[51] Int. Cl.$^4$ ............................................. B21D 28/26
[52] U.S. Cl. .................................... 29/527.2; 360/135
[58] Field of Search ........................... 360/135; 83/50; 29/527.2

[56] References Cited

U.S. PATENT DOCUMENTS 4,525,759  6/1985  Valayil et al. ........................ 360/135

FOREIGN PATENT DOCUMENTS

| 51-68207 | 6/1976 | Japan | 360/135 |
|---|---|---|---|
| 58-111131 | 7/1983 | Japan . | |
| 58-169012 | 10/1983 | Japan . | |
| 58-196626 | 11/1983 | Japan . | |
| 58-196625 | 11/1983 | Japan . | |
| 59-52775 | 3/1984 | Japan . | |
| 59-129941 | 7/1984 | Japan . | |
| 59-168934 | 9/1984 | Japan | 360/135 |
| 60-151838 | 8/1985 | Japan . | |
| 62-65871 | 3/1987 | Japan . | |
| 1415799 | 11/1975 | United Kingdom | 360/135 |

Primary Examiner—Timothy V. Eley
Assistant Examiner—Carl J. Arles
Attorney, Agent, or Firm—Sughrue, Mion, Zinn, Macpeak and Seas

[57] ABSTRACT

A method of making a magnetic recording medium comprises a first step of polishing a surface of a strip-like magnetic recording medium composed of a substrate and a magnetic layer formed on a surface of the substrate by coating a magnetic material onto the surface of the substrate and drying the coated magnetic material, a second step of inspecting the polished surface of the magnetic recording medium for defects, and a third step of punching out the magnetic recording medium, on which the inspection for defects is finished, into a predetermined shape. The first step, the second step and the third step are carried out on the continuous strip-like material.

4 Claims, 1 Drawing Sheet

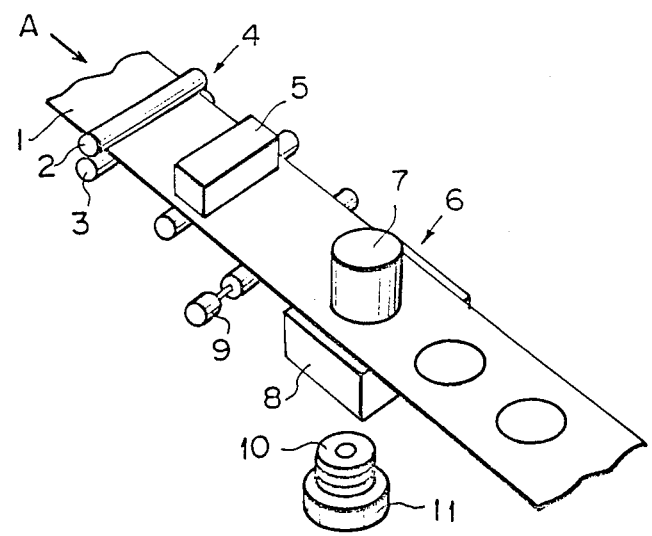

METHOD OF MAKING MAGNETIC RECORDING MEDIUM

BACKGROUND OF THE INVENTION

1. Field of the Invention

This invention relates to a method of making a magnetic recording medium such as a flexible magnetic disk. This invention particularly relates to a method of making a magnetic recording medium with high productivity, which efficiently carries out surface polishing, inspection for defects and punching out into a predetermined shape.

2. Description of the Prior Art

Floppy disks (FD) are widely used as external storage media for computers and word processors.

The floppy disks have heretofore been made by polishing the surfaces of disks punched out with a die into a ring-like shape from a strip-like substrate coated with a magnetic material and dried (hereinafter referred to simply as a film), and then subjecting the disks one by one to inspection for defects on the surfaces of the disks.

Polishing of the surface of the magnetic layer overlaid on the surface of the aforesaid film is carried out mainly for the purpose of eliminating defects such as protrusions on the surface. However, defects which cannot be removed only with the polishing often remain on the disks. Such defects give rise to recording failures or reproducing failures, and therefore the disks have to be inspected in an inspection step to find and eliminate those with defects. As the inspection method, the method as disclosed in Japanese Unexamined Patent Publication No. 59(1984)-52775 wherein recording and reproduction of a specific pattern are carried out by rotating the magnetic disks one by one is widely used. With the aforesaid method of making a floppy disk, since the surface polishing and the defect inspection are carried on the magnetic disks one by one after they are punched out into a ring-like shape, a long time is required for the operations, and productivity is low.

In order to solve the aforesaid problem, it has been proposed as disclosed in Japanese Unexamined Patent Publication No. 60(1985)-151838 to polish the surface of a strip-like film coated with a magnetic material by moving the film, and subsequently punch out the tape with a die into a predetermined shape to form floppy disks. With the proposed method, though the efficiency of the surface polishing step becomes high, a step of inspecting the floppy disks, which have been punched out into a predetermined shape, one by one for confirming whether defects are present on each floppy disk is necessary. In the inspecting step, inspection as in the conventional technique is carried out. Therefore, the productivity cannot be increased substantially.

SUMMARY OF THE INVENTION

The primary object of the present invention is to provide a method of making a magnetic recording medium, wherein surface polishing, defect inspection and punching out of a film into a predetermined shape are carried out efficiently.

Another object of the present invention is to provide a method of making a magnetic recording medium with high productivity.

The present invention provides a method of making a magnetic recording medium, which comprises a first step of polishing a surface of a strip-like magnetic recording medium composed of a substrate and a magnetic layer formed on a surface of said substrate by coating a magnetic material onto said surface of said substrate and drying said coated magnetic material, a second step of carrying out inspection of the polished surface of said magnetic recording medium for defects, and a third step of punching out said magnetic recording medium, on which the inspection for defects is finished, into a predetermined shape, wherein said first step, said second step and said third step are carried out in order on a continuous strip.

With the method of making a magnetic recording medium in accordance with the present invention, since inspection for defects on the film surface is carried out continuously with the film in the strip-like form, the inspection speed becomes markedly higher than with the conventional method wherein defect inspection is carried out by recording and reproducing a predetermined pattern while floppy disks are rotated. Therefore, it is possible to carry out the inspection step, the surface polishing step prior to the inspection step, and the punching out step on a continuous strip using a die after the inspection step, and to markedly improve the productivity.

BRIEF DESCRIPTION OF THE DRAWING

The single drawing is a perspective view showing an embodiment of the method of making a magnetic recording medium in accordance with the present invention.

DESCRIPTION OF THE PREFERRED EMBODIMENTS

The present invention will hereinbelow be described in further detail with reference to the accompanying drawing.

Referring to the drawing, a continuous strip-like film 1 on which a magnetic material has been coated and dried is moved in the direction as indicated by the arrow A, and guided to a polishing device 4 composed of polishing rolls 2 and 3 rotating at high speeds. The film 1 is grasped between the polishing rolls 2 and 3 at an appropriate pressure, and the surface of the film 1 is polished. The film 1 is subsequently guided to a defect inspecting device 5 disposed on the downstream side of the polishing device 4, and is inspected for defects on the film surface. As the defect inspecting device 5, a device for inspecting defects by an optical method as disclosed in, for example, Japanese Unexamined Patent Publication No. 58(1983)-169012, may be used. After the defect inspection is finished, the film 1 is guided to a punching device 6 disposed on the downstream side of the defect inspecting device 5, and punched out into a predetermined shape by a punch 7 and a die 8 which may be of the known type. In order to eliminate a film portion detected to be defective by the defect inspecting device 5, a counter roll 9 is disposed between the defect inspecting device 5 and the punching device 6. In this manner, the operation of the punching device 6 is stopped when the film portion detected to be defective arrives at the punching device 6, and the defective film portion is moved to the downstream side of the punching device 6 without being punched out. The punching device 6 is operated normally for the portions of the film 1 where no defect is detected, and punches out the film portions into a predetermined shape. The floppy disks 10, 10, . . . thus punched out from the film 1 are stacked on a stacking section 11 disposed below the punching device 6, and sent to the subsequent step. This embodiment may also be constituted so that, in the case where a defect is detected at a film portion, the defective film portion is punched out by the punching device 6 into a floppy disk, and the floppy disk thus punched out from the defective film portion is prevented from being sent to the stacking section 11 by use of a known means.

With the aforesaid embodiment, since polishing of the surfaces of the floppy disks, inspection of defects on the floppy disk surfaces, and punching out into a predetermined shape can be carried out on the continuous strip film, it is possible to markedly improve the productivity. Also, since only the acceptable floppy disks having no defects are sent to the steps subsequent to the punching device 6, it is possible to improve the efficiency of the steps on the downstream side of the punching device 6.

Beside the case where the magnetic layer is overlaid on one surface of the film 1, the present invention is applicable also to the case where the magnetic layer is formed on both surfaces of the film 1. In this case, the polishing rolls 2 and 3, and the defect inspecting device 5 may be disposed independently for the upper and lower surfaces of the film 1.

I claim:

1. A method of making a magnetic recording medium, which comprises a first step of polishing a surface of a strip-like magnetic recording medium in continuous strip form composed of a substrate and a magnetic layer formed on a surface of said substrate by coating a magnetic material onto said surface of said substrate and drying said coated magnetic material, a second step of carrying out inspection of the polished surface of said magnetic recording medium for defects, and a third step of punching out said magnetic recording medium, and a third step of punching out said magnetic recording medium, on which the inspection for defects is finished, into a predetermined shape, wherein said first step, said second step and said third step are carried out in order on the continuous strip, moved sequentially through polishing, inspection and punching stations.

2. A method as defined in claim 1 wherein only the acceptable pieces punched out from portions of said magnetic recording medium detected to be acceptable in said second step are separated and stacked in said third step.

3. A method as defined in claim 1 wherein operation of said third step is momentarily terminated when a portion of said magnetic recording medium detected to be defective in said second step arrives at said third step.

4. A method as defined in claim 1 wherein said magnetic recording medium in continuous strip form is a flexible magnetic recording medium, and flexible magnetic disks are punched out from said magnetic recording medium.

* * * * *